United States Patent
Mehta et al.

(10) Patent No.: US 7,542,446 B2
(45) Date of Patent: Jun. 2, 2009

(54) SPACE TIME TRANSMIT DIVERSITY WITH SUBGROUP RATE CONTROL AND SUBGROUP ANTENNA SELECTION IN MULTI-INPUT MULTI-OUTPUT COMMUNICATIONS SYSTEMS

(75) Inventors: Neelesh B. Mehta, Medford, MA (US); Pallav Sudarshan, Raleigh, NC (US); Andreas F. Molisch, Arlington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 601 days.

(21) Appl. No.: 10/828,626

(22) Filed: Apr. 21, 2004

(65) Prior Publication Data

US 2004/0196919 A1 Oct. 7, 2004

Related U.S. Application Data

(63) Continuation-in-part of application No. 10/209,306, filed on Jul. 31, 2002, now Pat. No. 7,092,737.

(51) Int. Cl.
*H04Q 7/00* (2006.01)
*H04B 1/02* (2006.01)
*H04K 1/10* (2006.01)

(52) U.S. Cl. ............... 370/330; 370/329; 370/334; 370/201; 370/204; 370/208; 455/101; 455/102; 455/103; 455/562.1; 375/260

(58) Field of Classification Search ............... 700/53; 375/299, 146, 267, 260; 455/101–103, 63.4, 455/504–506, 562.1; 370/203–211; 343/700, 343/725
See application file for complete search history.

(56) References Cited

U.S. PATENT DOCUMENTS 6,542,556 B1 * 4/2003 Kuchi et al. ............ 375/299

(Continued)

FOREIGN PATENT DOCUMENTS

WO  WO2004/014013 A1  2/2004

OTHER PUBLICATIONS

U.S. Appl. No. 10/209,306, filed Jul. 31, 2002, Horng et al.

(Continued)

*Primary Examiner*—Lester Kincaid
*Assistant Examiner*—Daniel Lai
(74) *Attorney, Agent, or Firm*—Dirk Brinkman; Gene Vinokur

(57) ABSTRACT

A method and system transmits an input stream of data symbols in a multiple-input/multiple-output wireless communications system that includes M subgroups of transmitting antennas. A stream of data symbols is provided to a combined switch and demultiplexer. The combined switch and demultiplexer selects a subset L of the M subgroups of antennas as active, where L<M. The demultiplexer then splits the data stream into L substreams, which are fed to the L subgroups of antennas. Before transmission, each of the L substreams is adaptively modulated and coded to a maximum data rate while achieving a predetermined performance on an associated channel used to transmit the substream. Space-time transmit diversity encoding is applied to each coded substream to generate multiple output streams, one output stream for each antenna of each of the L subgroups. The selection by the switch is based on channel conditions fed back by a receiver of the output streams.

15 Claims, 4 Drawing Sheets

U.S. PATENT DOCUMENTS

| | | | |
|---|---|---|---|
| 6,934,320 B2* | 8/2005 | Tujkovic et al. | 375/146 |
| 7,184,703 B1* | 2/2007 | Naden et al. | 455/10 |
| 2002/0102950 A1* | 8/2002 | Gore et al. | 455/101 |
| 2002/0132600 A1* | 9/2002 | Rudrapatna | 455/277.1 |
| 2003/0076787 A1* | 4/2003 | Katz et al. | 370/252 |
| 2003/0103474 A1* | 6/2003 | Kim | 370/320 |
| 2003/0235147 A1* | 12/2003 | Walton et al. | 370/204 |

OTHER PUBLICATIONS

Foschini et al., "*On Limits of Wireless Communications in a Fading Environment when Using Multiple Antennas*," Wireless Pers. Commun., pp. 311-335, 1998.

Wolniansky et al., "*V-Blast: An Architecture for Realizing Very High Data Rates Over the Rich-Scattering Wireless Channel*," ISSSE, pp. 295-299, 1998.

Sellathurai egt al., "*Turbo-Blast for Wireless Communications: Theory and Experiments*," IEEE Trans. Commun., vol. 50, No. 10, pp. 2538-2546, Oct. 2002.

Tarokh et al., "*Space Time Codes for High Data Rate Wireless Communication*," IEEE Trans. Inform. Theory, vol. 44, pp. 744-765, 1999.

Alamouti, "*A simple transmit diversity technique for wireless communications*," IEEE J. Selected Areas in Commun., vol. 16, Oct., pp. 1451-1458, 1998.

Zheng and Tse, "*Diversity and Multiplexing: A Fundamental Tradeoff in Multiple-Antenna Channels*," IEEE Transactions on Information Theory, Vol. 49, No. 5, pp. 1073-1096, May 2003.

Katz et al., "Combining space-time block coding with diversity antenna selection for improved downlink performance," Proceedings of IEEE 54th Vehicular Technology Conference, vol. 1, pp. 178-182, Oct. 7, 2001.

* cited by examiner

SPACE TIME TRANSMIT DIVERSITY WITH SUBGROUP RATE CONTROL AND SUBGROUP ANTENNA SELECTION IN MULTI-INPUT MULTI-OUTPUT COMMUNICATIONS SYSTEMS

RELATED APPLICATION

This application is a Continuation-in-Part of U.S patent application Ser. No. 10/209,306, "MIMO Systems with Rate Feedback and Space Time Transmit Diversity," filed by Horng, et al. on Jul. 31, 2002 now U.S. Pat. No. 7,092,737. This application is related to U.S. Patent Application "Multiple Antennas at Transmitters and Receivers to Achieving Higher Diversity and Data Rates in MIMO Systems," by Mehta et al., co-filed herewith, and incorporated herein by reference.

FIELD OF THE INVENTION

The invention relates generally to wireless communications, and more particularly to multiple input/multiple output wireless communications systems with variable rate encoding and subgroup selection.

BACKGROUND OF THE INVENTION

In a wireless communication system, such as $3^{rd}$ generation (3G) wireless code-division multiple access (CDMA) system, it is desired to concurrently support multiple services and multiple data rates for multiple users in a fixed bandwidth channel. A number of modulation and coding schemes (MCS) are known. One scheme uses adaptive modulation and coding (AMC) to modulate and encode user data symbols before transmission.

In order to increase the capacity of a wireless communication system in fading channel environments, transmit diversity is widely adopted. In 3G systems, an open loop solution uses two antennas for transmission and a single antenna for reception. In such a system, every two symbols of the transmitted data is further encoded by a space-time transmit diversity (STTD) encoder to generate four encoded symbols, two symbols for each antenna. Each antenna transmits different symbol streams through the channel to reach diversity gains.

To support real-time multimedia services in a fixed channel bandwidth, multiple input/multiple output (MIMO) systems have been developed for high data rate transmissions in wireless communication systems, such as high speed downlink packet access (HSDPA) in WCDMA systems. In a MIMO system, multiple antennas are used by the transmitter and the receiver to increase the capacity of the system.

In general, the system capacity is improved as the dimension of the diversity, i.e., number of the antennas, increases. For very high speed transmission, a large number of antennas might be necessary to reach the target performances. One solution to this problem is to extend the current STTD system to MIMO configurations. In such a system, the compatibility with the current STTD system needs to be remained in order to use current STTD system for lower data rate transmission, such as voice services, while the system capacity is improved due to the use of MIMO configurations.

SUMMARY OF THE INVENTION

The invention provides a transmitter for multiple input/ multiple output (MIMO) wireless communications systems. The invention is compatible with space time transmit diversity (STTD), which is widely adopted in 3G wireless communication systems, such as W-CDMA systems for the 3GPP standard, and CDMA2000 systems for the 3GPP2 standard.

The invention applies adaptive modulation and coding (AMC) to each subgroup of the antenna systems to match different channel conditions with required service performance and reach the maximal system capacities. More specifically, this invention is suitable for high data rate transmission for MIMO systems, while retaining compatibility with existing STTD schemes. The invention can be used for high data rate transmission, as well as for lower rate transmissions such as voice services, to increase the total number of the active users within one cell.

In the preferred embodiment, a subset of the available antenna subgroups are selected and used, depending on channel conditions.

DETAILED DESCRIPTION OF THE PREFERRED EMBODIMENT

Figure 1:
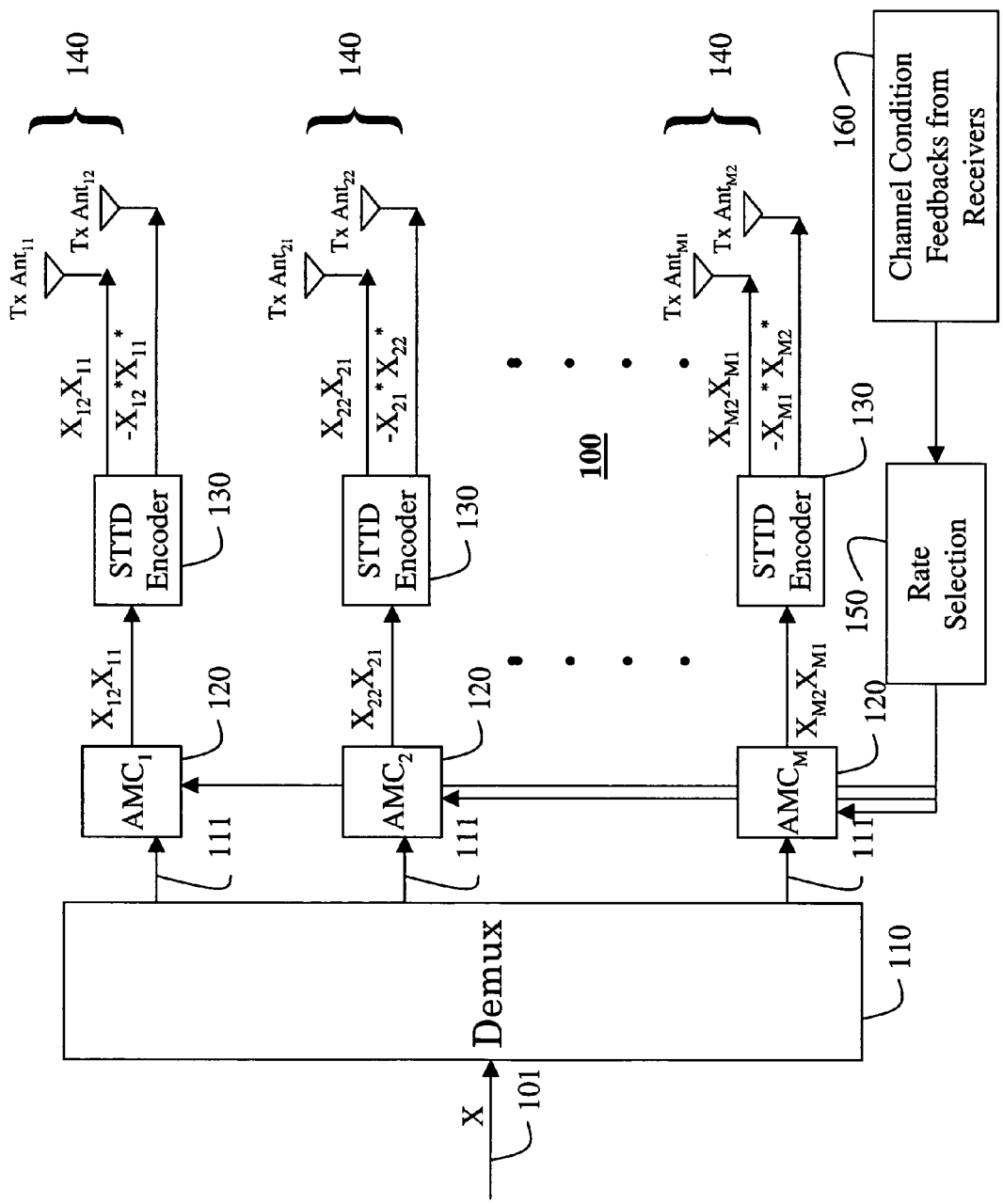
FIG. 1 is a block diagram of a transmitter in a multiple-input/multiple-output wireless communications system according to the invention.

FIG. 1 shows a transmitter 100 for a multiple-input/multiple-output (MIMO) wireless communications system according to the invention. The transmitter 100 includes a demultiplexer 110 coupled to multiple (M) adaptive modulation and coding (AMC) blocks 120. The output of each AMC block is coupled to a space-time transmit diversity (STTD) encoder 130s. The outputs of the STTD encoders are coupled to N antennas 140, where each encoder is coupled to subgroups of antennas, for example, groups of two.

The system 100 also includes a rate selector 150 receiving channel conditions 160 from receivers, not shown. The channel conditions can include the received signal-to-noise-ratio (SNR) for each transmit channel. The channel conditions 160 can be updated periodically, or as needed. The channel condition can be used for rate selection 150.

During operation of the system 100, a stream of data symbols X 101 is first demultiplexed 110 into M substreams 111, where M is half the total number N antennas 140. The M substreams are encoded by the M AMCs 120 at M data rates.

The M data rates are determined by the channel condition feedbacks 160 from the receivers, not shown. Accordingly, each AMCs encodes the substream at a maximum data rate to achieve a predetermined service performance for the associated channel. Essentially, the service performance is a measure of the error rate, e.g., bit error rate (BER), frame error rate (FER), or SNR.

The AMCs 120 use a predefined combinations of modulations, e.g., QPSK, 8-PSK, 16-QAM, etc, and channel codings, such as convolutional coding and turbo coding with various coding rates, which define the information rates or capacity for each substream. Here, a better channel condition means a higher data rate is achievable with a predetermined service performance under such a channel condition.

For each substream 111, the corresponding AMC block 120 outputs the information symbols $X_{i1}$, and $X_{i2}$, for i=1, 2, ..., M, which are feed to the STTD encoder block 130, as shown in FIG. 1. The STTD 130 encodes the input information symbols and the outputs are given by $$\begin{bmatrix} X_{i2} & X_{i1} \\ -X_{i1}^* & X_{i2}^* \end{bmatrix}, \quad (1)$$

where * is the complex conjugate. Each row of the STTD output matrix in Equation (1) represents the output to a specific transmit antenna 140. There are two transmit antennas for each substream 111, and therefore, there are total N=2M antennas 140.

In order to adaptively allocate different data rates for each substream 111, it is necessary for the receiver to perform channel or SNR estimations for the received signal from each transmit antenna, and report this back to the transmitter as the channel condition 160.

The feedback information can be encoded and modulated for transmission in order to reduce errors in the feedback information. The channel condition feedbacks can be updated periodically from the receivers. In general, higher update frequency is favorable in order to follow the channel condition closely, which achieves higher system capacity. In order to keep the feedback information amount a reasonable size, the number of modulation and channel coding combinations is as small as possible.

Selecting SubGroups of Antennas

Figure 2:
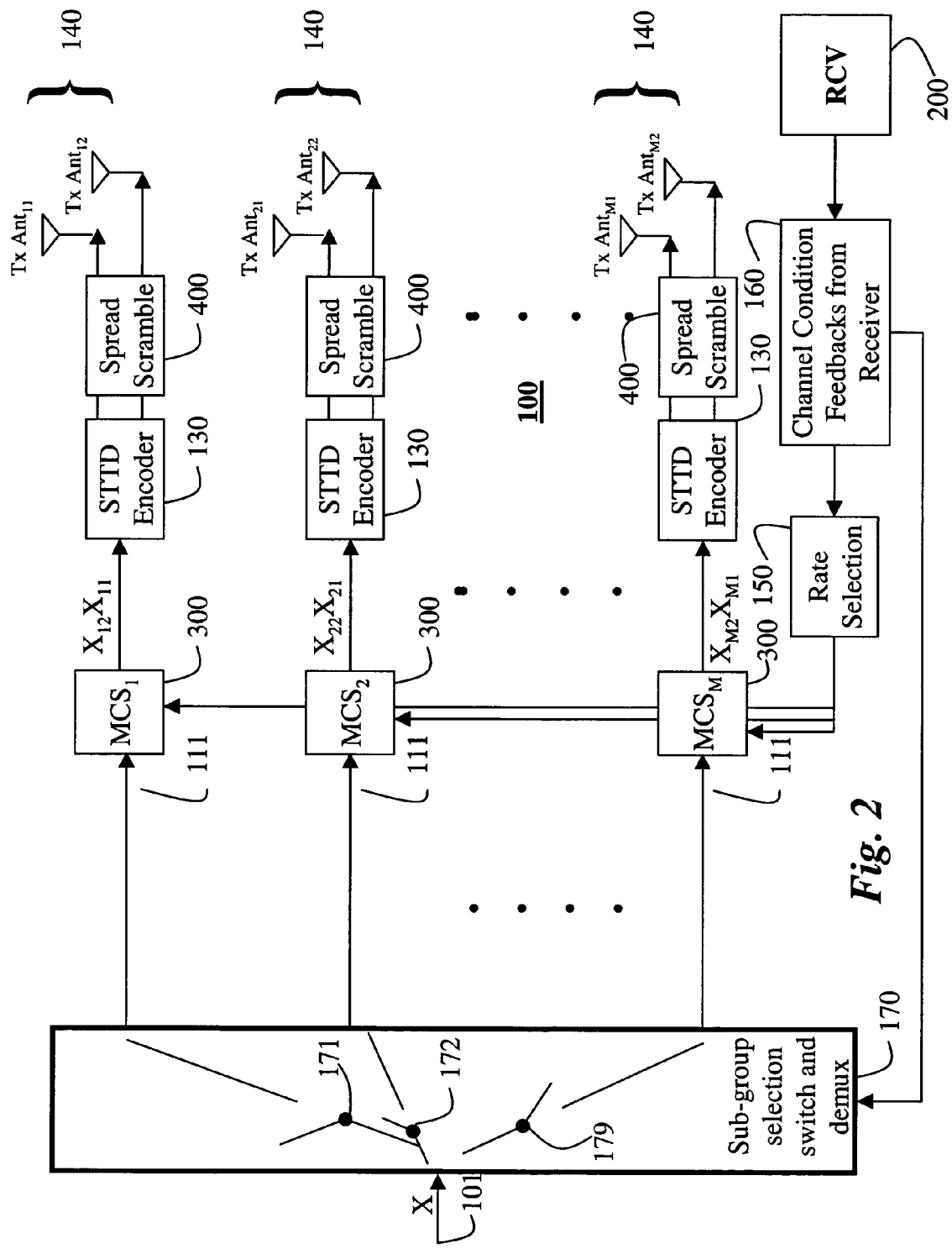
FIG. 2 is a block diagram of a transmitter in a multiple-input/multiple-output wireless communications system according to the invention with antenna subgroup selection.

However, under certain channel conditions, which are common, it is advantageous to resort to subgroup selection 170, as shown in FIG. 2. With subgroup selection, only L subgroups of the M subgroups of antennas are used, wherer L<M. Subgroups of antennas that are not used are referred to as 'inactive', and the used subgroups of antennas are called 'active'.

One example of such a channel condition is when the transmitter determines that the signal to interference plus noise ratio (SINR) of a particular subgroup of antennas, as determined at a particular receiver 200 of the transmitted output streams, is insufficient to meet the bit error rate (BER) requirements of even the lowest rate modulation and coding scheme (MCS) 300 for the data stream of that subgroup. By shutting off the entire subgroup of antennas, the interference generated by this inactive subgroup is eliminated. Consequently, higher data rate can be selected for the remiaining active subgroups, if the number of subgroups L is less than M. In such a case, based on which subgroups are inactive, the transmitter redetermines the appropriate MCSs 300 for the remaining L subgroups, based on the selected subgroups.

Even if all the subgroups can meet the BER requirements while active, shutting-off some of the subgroups can still increase the total data rate, due to a reduction in inter-subgroup interference. For a system where the total power radiated from all the antennas is constrained, shutting off some subgroups also ensures that a larger fraction of the total power is allocated to active subgroups with a higher SINR. Without this solution, target BERs, which are used to determine the MCS 300 for each subgroups, based on feedback from the receiver 200, may not be achievable.

The receiver can also perform MCS selection, either jointly or independently, for all the subgroups, and feed this back to the transmitter.

Under extreme adverse channel conditions, all the subgroups can be made inactive. Surprisingly, this also can improve a total performance of the system. This can occur when the channel condition for every of the subgroups cannot meet minimum BER requirements for a particular receiver. Transmitting under such adverse conditions has two problems. First, no data are delivered to the particular receiver, thus valuable bandwidth is needlessly wasted. Second, transmitting under such conditions only cause unnecessary interference for other receivers in the system. Thus, selecting none of the subgroups, for a particular receiver, increases the overall capacity of the system for the remaining receivers.

Therefore, in the transmitter shown in FIG. 2, only subgroups that meet minimum SINR requirements are selected 170 by switches 171-179 to be active for tranmission. Other subgroups are deselected and inactive for transmission.

This can be done by feeding the multiple copies of the data stream 101, in parallel, to the switch 170. There is one copy for each antenna subgroup. Only a subset of the copies of the data stream corresponding to the active subgroups are passes through to the demultiplexer. Effectively, the switch and demultiplexer 170 selects a set of the L substream 111 as being active for further processing, where L<M. All other deselected copies of the M substreams are inactive and no further processing is done on those substreams. That is, the set of L substreams 111 can inlude none or some of the M substreams.

Adapive Modulation and Coding

Figure 3:
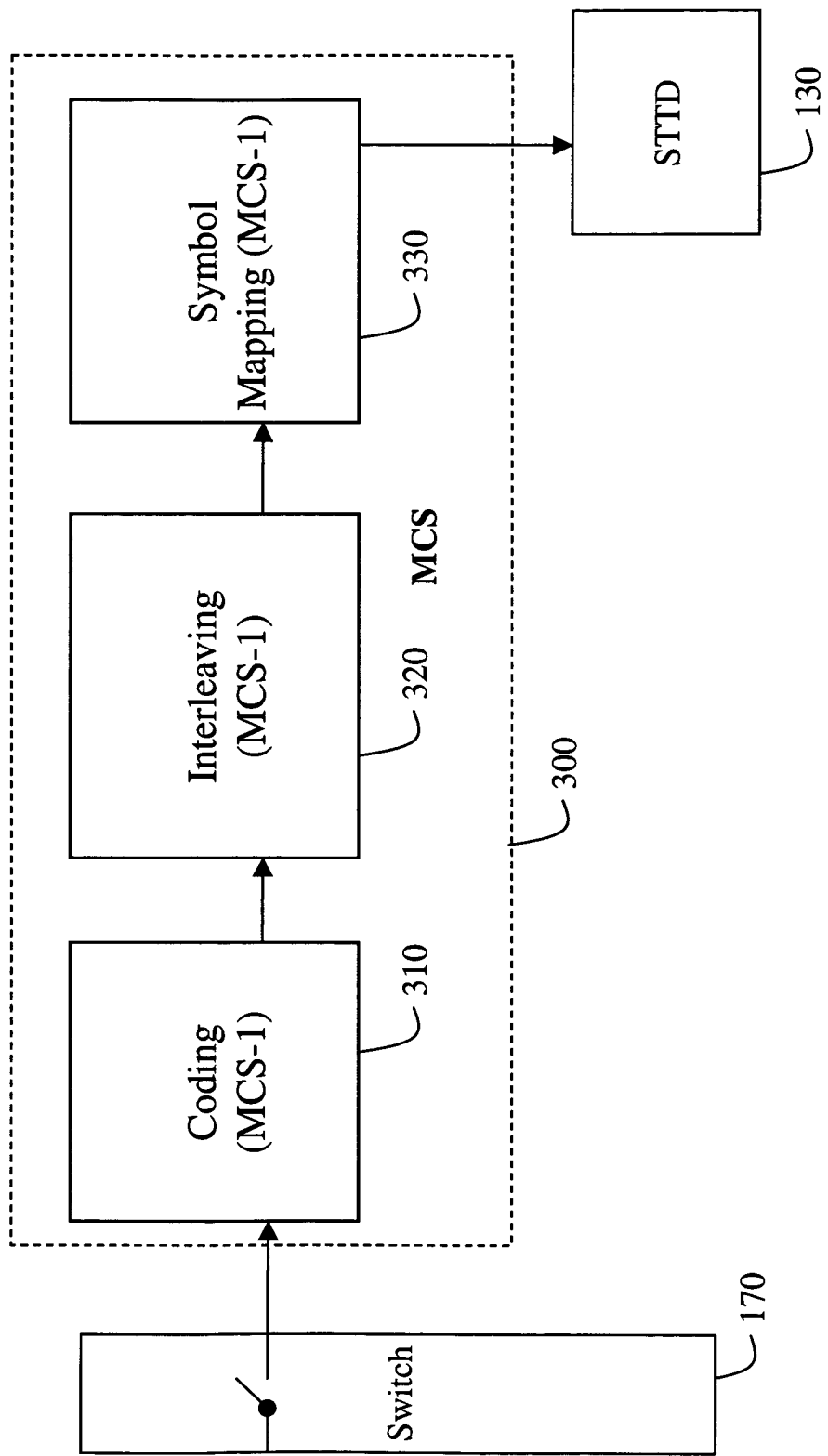
FIG. 3 is a block diagram of a modulation and coding scheme block according to the invention.

As shown in FIG. 3, each MCS block 300 in FIG. 2 include three blocks for coding 310, interleaving 320, and symbol mapping 330. The operation performed by these three blocks depends on the selected MCS for the subgroup.

Futhermore, code reuse has been added for use with this scheme. In code reuse, the same orthogonal variable spreading factor (OVSF) codes are used by all or some of the sub-groups transmitting the streams. The presence of scrambling code(s), discussed below, ensures that the inter-code interference is reduced by a factor equal to the spreading gain. The allocation of the OVSF codes to the various sub-groups may be optimized to further reduce the inter-code interference.

Scrambling Codes

Figure 4:
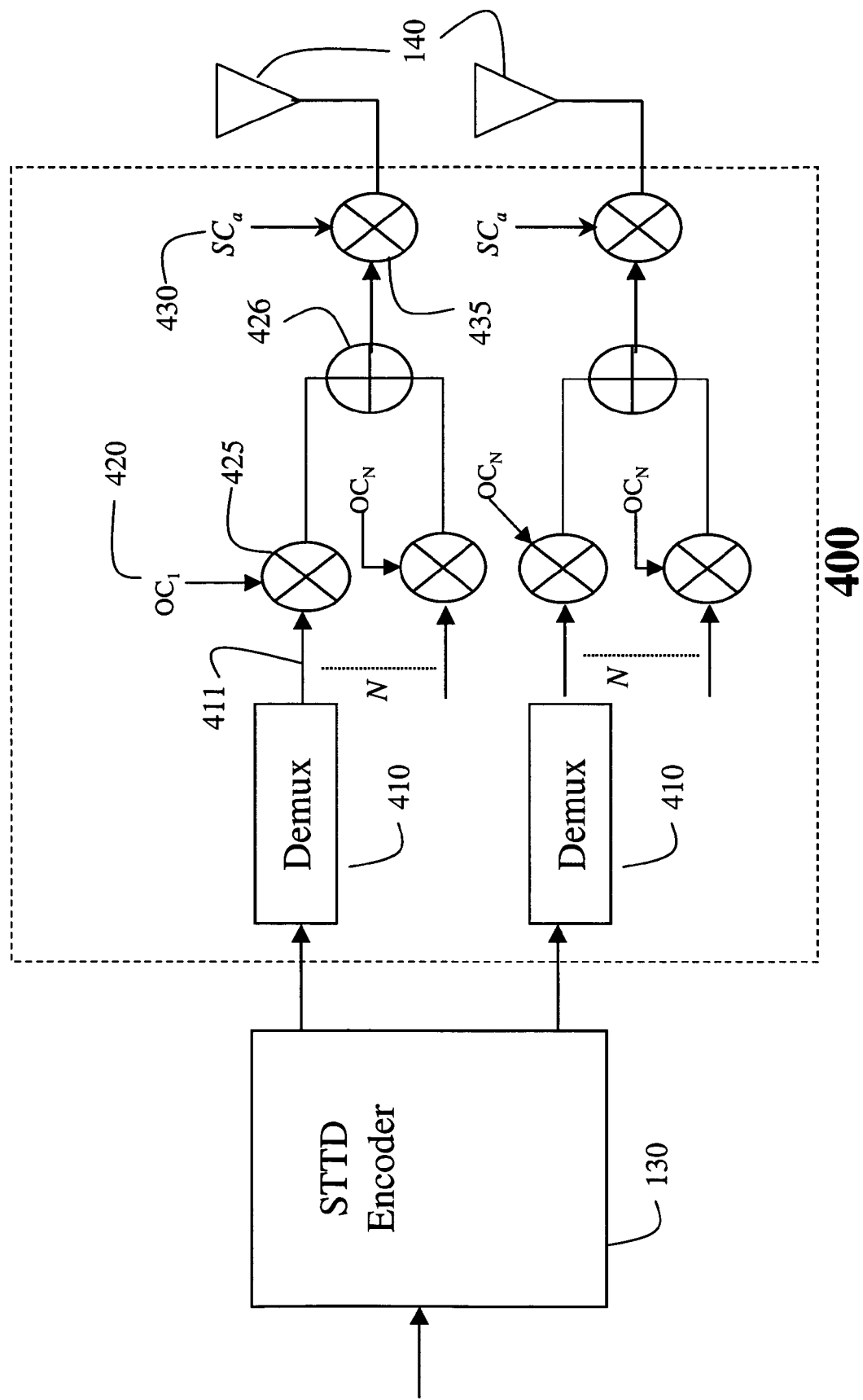
FIG. 4 is a block diagram of a spreading and scrambling block according to the invention.

As shown in FIG. 4, scrambling 400 is applied to each data stream, e.g., X12X11and −X12*X11*. For each subgroup, after the STTD encoding 130, the subgroup is futher demultiplexed 410 into N data substreams 411. Here N, is the number of orthogonal variable spreading factor (OVSF) codes (OC) 420 used for transmission. Each OC 420 is multiplied 425 times one of the N demultiplexed steams 411. The spread streams are added 426. This is followed by multiplication 435 with a scrambling code (SC) 430.

The same scrambling code can be used for all subgroups to reduce the complexity of the systm. The scrambling codes reduces inter-subgroup interference at the receiver.

It is to be understood that various other adaptations and modifications may be made within the spirit and scope of the invention. Therefore, it is the object of the appended claims to cover all such variations and modifications as come within the true spirit and scope of the invention.

The invention claimed is:

1. A method for transmitting an input stream of symbols in a multiple-input/multiple-output wireless communications system including M subgroups of transmitting antennas, comprising:

selecting, according to channel conditions of the multiple-input/multiple-output wireless communications system, L subgroups of the M subgroups of antennas, where L<M and each of the L subgroups of antennas includes a set of at least two antennas;

demultiplexing, the input stream into L substreams, there being one substream for each one of the L selected subgroups of at least two antennas;

adaptively modulating and coding each of the L sub streams to a maximum data rate while achieving a predetermined performance on an associated channel used to transmit the substream;

space-time transmit diversity encoding each of the L coded substreams into a set of at least two output streams, there being one output stream for each antenna in the set of at least two antennas of each one of the L subgroups of antennas, wherein the selecting is performed before the adaptively modulating and coding and the space-time transmit diversity encoding; and transmitting the set of at least two output streams using the L subgroups of at least two antennas.

2. The method of claim 1, further comprising:
feeding back, from a receiver, channel conditions; and
selecting a data rate according to the channel conditions.

3. The method of claim 2, in which the channel conditions used to select the data rate measure a signal to interference plus noise ratio of the output streams received in the receiver.

4. The method of claim 1, in which the adaptive modulation and coding depends on the number L of the substreams.

5. The method of claim 1, in which L is zero to increase an overall capacity of the system including a plurality of receivers.

6. The method of claim 1, in which the adaptive modulating and coding, further comprises:
coding each sub stream;
interleaving each coded substream; and
symbol mapping each interleaved substream.

7. The method of claim 1, further comprising:
demultiplexing each output stream into a plurality demultiplexed output streams;
multiplying each of the plurality of demultiplexed output streams by an orthogonal variable spreading factor;
adding the demultiplexed output streams, for each output stream, after multiplication into a summed output stream corresponding to each output stream; and
multiplying each summed output stream by a scrambling code.

8. The method of claim 7, wherein the orthogonal variable spreading factors are the same for all output streams.

9. The method of claim 7, wherein the scrambling codes are the same for all output streams.

10. The method of claim 1, wherein each input substream includes pairs of symbols $X_{i1}$ and $X_{i2}$, and wherein the space-time transmit diversity encoding encodes each pair of symbols as two pairs of symbols $$\begin{bmatrix} X_{i2} & X_{i1} \\ -X_{i1}^* & X_{i2}^* \end{bmatrix},$$

where * is a complex conjugate.

11. The method of claim 10, wherein each pair of symbols $X_{i1}$ and $X_{i2}$ is transmitted by a first antenna of the set of at least two antennas while each pair of symbols $-X^*_{i2}$ and $X^*_{i1}$ is transmitted by a second antenna of the set of at least two antennas.

12. The method of claim 1, further comprising:
performing the adaptively modulating and coding and the space-time transmit diversity encoding in parallel and independently for each substream.

13. The method of claim 1, wherein the number of selected antennas is at least 2L.

14. The method of claim 1, wherein performance reaches a maximal system capacities.

15. A system for transmitting an input stream of symbols in a multiple-input/multiple-output wireless communications system including M subgroups of transmitting antennas, comprising:
a switch configured to select, according to channel conditions of the multiple-input/multiple-output wireless communications system, L subgroups of the M subgroups of antennas, where L<M and each of the L subgroups of antennas includes a set of at least two antennas;
a demultiplexer configured to split the input stream into L substreams, there being one substream for each one of the L subgroups of at least two antennas;
means for adaptively modulating and coding each of the L substreams to a maximum data rate while achieving a predetermine performance on an associated channel used to transmit the substream, wherein the switch selects before adaptively modulating and coding and space-time transmit diversity encoding; and
means for space-time transmit diversity encoding each of the L coded substream into a set of at least output streams, there being one output stream for each antenna in the set of at least two antennas of each one of the L subgroups of antennas.

* * * * *